(12) United States Patent
Holford et al.

(10) Patent No.: US 9,797,987 B2
(45) Date of Patent: Oct. 24, 2017

(54) CORRECTING FREQUENCY ERRORS IN FREQUENCY DIFFERENCE OF ARRIVAL GEOLOCATION SYSTEMS

(71) Applicant: Zeta Associates, Inc., Fairfax, VA (US)

(72) Inventors: John M. Holford, Oakton, VA (US); James M. Williams, Oak Hill, VA (US); Michael E. Glidewell, Las Cruces, NM (US)

(73) Assignee: Zeta Associates, Inc., Fairfax, VA (US)

( * ) Notice: Subject to any disclaimer, the term of this patent is extended or adjusted under 35 U.S.C. 154(b) by 1013 days.

(21) Appl. No.: 14/053,970

(22) Filed: Oct. 15, 2013

(65) Prior Publication Data

US 2014/0104108 A1    Apr. 17, 2014

Related U.S. Application Data

(60) Provisional application No. 61/795,363, filed on Oct. 15, 2012.

(51) Int. Cl.

| | |
|---|---|
| *G01S 1/00* | (2006.01) |
| *G01S 5/06* | (2006.01) |
| *G01S 19/38* | (2010.01) |
| *G01S 1/02* | (2010.01) |
| *G01S 5/02* | (2010.01) |
| *G01S 19/42* | (2010.01) |

(52) U.S. Cl.
CPC .............. *G01S 5/06* (2013.01); *G01S 5/021* (2013.01); *G01S 19/38* (2013.01); *G01S 1/02* (2013.01); *G01S 5/02* (2013.01); *G01S 5/0221* (2013.01); *G01S 19/42* (2013.01)

(58) Field of Classification Search
CPC ... G01S 5/02; G01S 5/021; G01S 5/06; G01S 5/0221; G01S 19/38; G01S 19/42; G01S 1/24
USPC ............ 342/357.21, 357.25, 385, 465
See application file for complete search history.

(56) References Cited

U.S. PATENT DOCUMENTS

| | | | |
|---|---|---|---|
| 6,169,514 B1 * | 1/2001 | Sullivan ............ | G01S 5/02 342/357.2 |
| 7,515,104 B2 * | 4/2009 | Ray .................... | G01S 5/021 342/464 |
| 8,098,155 B2 * | 1/2012 | Gloo .................. | G01S 5/04 340/539.11 |

(Continued)

*Primary Examiner* — Chuong P Nguyen
(74) *Attorney, Agent, or Firm* — Jeffrey T. Placker; Holland & Knight LLP

(57) ABSTRACT

A frequency correction for frequency difference of arrival geolocation of transmitted target signals may be provided. A frequency of a target signal may be determined at a first collector based upon a first reference timebase source. A frequency of the target signal may be determined at a second collector based upon a second reference timebase source. An observed frequency of a reference carrier signal based upon the first reference timebase source may be determined at the second collector based upon the second reference timebase source. A relative timebase error between the first collector and the second collector may be calculated based upon a difference between the intended frequency of the reference carrier signal and the observed frequency of the reference carrier signal. A corrected frequency difference for the target signal may be calculated based upon the relative timebase error and a proportional scaling factor.

27 Claims, 6 Drawing Sheets

(56) References Cited

U.S. PATENT DOCUMENTS

| | | | | |
|---|---|---|---|---|
| 8,193,981 B1* | 6/2012 | Hwang | ............... | G01S 5/06 |
| | | | | 342/357.63 |
| 8,421,676 B2* | 4/2013 | Moshfeghi | ............ | G01S 5/14 |
| | | | | 342/442 |
| 8,866,672 B2* | 10/2014 | Stroud | ............. | G01S 1/04 |
| | | | | 342/378 |
| 9,661,604 B1* | 5/2017 | O'Shea | ............ | H04W 64/00 |
| 2010/0317343 A1* | 12/2010 | Krishnamurthy | ....... | G01S 1/30 |
| | | | | 455/435.1 |
| 2013/0106657 A1* | 5/2013 | Perthold | ............ | G01S 5/021 |
| | | | | 342/387 |
| 2014/0266907 A1* | 9/2014 | Taylor, Jr. | ........... | G01S 5/10 |
| | | | | 342/387 |
| 2014/0378161 A1* | 12/2014 | Sellier | ............. | G01S 5/06 |
| | | | | 455/456.1 |

* cited by examiner

CORRECTING FREQUENCY ERRORS IN FREQUENCY DIFFERENCE OF ARRIVAL GEOLOCATION SYSTEMS

CROSS-REFERENCE TO RELATED APPLICATION

This application claims the benefit of U.S. provisional patent application Ser. No. 61/795,363, filed 15 Oct. 2012, entitled "CORRECTING FREQUENCY ERRORS IN FDOA GEOLOCATION SYSTEMS," the entire disclosure of which is incorporated herein by reference.

TECHNICAL FIELD

The present disclosure generally relates to systems and methods for frequency difference of arrival geolocation of transmitted signals, and more particularly relates to correcting frequency errors in frequency difference of arrival geolocation systems.

BACKGROUND

Typically, making accurate relative frequency measurements between two distant radio receiving systems may be based on two main strategies. The first strategy is to provide both receivers with very accurate timebase frequency references, such as Rubidium-based atomic clocks. The difference of two such accurate frequency references will be very small, resulting in a negligible error. It is common practice to discipline such atomic clocks using signals received from the Global Positioning System (GPS). Given the short term inaccuracies of GPS, and its low signal strength, the integration time required to obtain a high accuracy frequency (minutes to days) may be so long that only the highest quality oscillators will not have drifted significantly during the integration period.

The second strategy typically involves deploying cooperative reference transmitter devices into the environment. The transmitter devices may be deployed at known positions, which may be distinct from either of the two signal collectors. Ideally, the transmitter devices may be deployed relatively close to a target transmitter that is to be located. Comparing the frequency differences obtained by processing the reference transmitter's waveform through a geolocation algorithm versus that predicted a priori from the Doppler shifts shat should be obtained given the radio carrier frequencies and kinematics of the collectors and the reference transmitter may allow the error in relative frequency to be inferred.

SUMMARY OF DISCLOSURE

According to an implementation, a computer-implemented method may include determining a frequency of a target signal at a first collector based upon, at least in part, a first reference timebase source associated with the first collector. An intended frequency of a reference carrier signal at the first collector may be determined based upon, at least in part, the first reference timebase source associated with the first collector. The method may also include determining a frequency of the target signal at a second collector based upon, at least in part, a second reference timebase source associated with the second collector. An observed frequency of the reference carrier signal at the second collector may be determined based upon, at least in part, the second reference timebase source associated with the second collector. The method may also include calculating a relative timebase error between the first collector and the second collector based upon, at least in part, a difference between the intended frequency of the reference carrier signal and the observed frequency of the reference carrier signal. The method may further include calculating a corrected frequency difference for the target signal based upon, at least in part, the relative timebase error and a proportional scaling factor.

One or more of the following features may be included. Determining the intended frequency of the reference carrier signal may include transmitting the reference carrier signal having the intended frequency based upon, at least in part, the first reference timebase source. Determining the frequency of the target signal at the first collector may include receiving data based upon, at least in part, a digitized representation of the target signal from the first collector. Receiving the data based upon, at least in part, the digitized representation of target signal may include receiving the digitized representation modulated onto the reference carrier signal.

Determining the intended frequency of the reference carrier signal may be based upon, at least in part, determining a predetermined intended frequency of the reference carrier signal. Determining the intended frequency of the reference carrier signal may include receiving the reference carrier signal. Determining the intended frequency of the reference carrier signal may further include determining the frequency of the received reference carrier signal based upon, at least in part, the first reference timebase source. Receiving the reference carrier signal may include receiving the reference carrier signal at the first collector.

The first collector may be moving relative to a source of the target signal. The method may further include determining a first state vector associated with the first collector, the first state vector including position and velocity information associated with the first collector. The method may also include determining a relative movement between the first collector and the second collector based upon, at least in part, the first state vector. Calculating the relative timebase error may include compensating for a frequency shift based upon, at least in part, the relative movement between the first collector and the second collector. The second collector may be moving relative to the source of the target signal. The method may further include determining a second state vector associated with the second collector, the second state vector including position and velocity information associated with the second collector. Determining the relative movement between the first collector and the second collector may be based upon, at least in part the first state vector and the second state vector. Calculating the relative timebase error may include compensating for the frequency shift based upon, at least in part, the relative movement between the first collector and the second collector.

The method may further include geolocating a source of the target signal based upon, at least in part, calculated time difference of arrival and frequency difference of arrival of the target signal at the first collector and at the second collector and based upon, at least in part, the calculated corrected frequency difference for the target signal.

According to another implementation, a computer program product includes a computer readable medium having a plurality of instructions stored on it. When executed by a processor, the instructions may cause the processor to perform operations including determining a frequency of a target signal at a first collector based upon, at least in part, a first reference timebase source associated with the first collector. Instructions may also be included for determining an intended frequency of a reference carrier signal at the first collector based upon, at least in part, the first reference timebase source associated with the first collector. Instructions may also be included for determining a frequency of the target signal at a second collector based upon, at least in part, a second reference timebase source associated with the second collector. Instructions may also be included for determining a observed frequency of the reference carrier signal at the second collector based upon, at least in part, the second reference timebase source associated with the second collector. Instructions may also be included for calculating a relative timebase error between the first collector and the second collector based upon, at least in part, a difference between the intended frequency of the reference carrier signal and the observed frequency of the reference carrier signal. Instructions may further be included for calculating a corrected frequency difference for the target signal based upon, at least in part, the relative timebase error and a proportional scaling factor.

One or more of the following features may be included. The instructions for determining the intended frequency of the reference carrier signal may include instructions for transmitting the reference carrier signal having the intended frequency based upon, at least in part, the first reference timebase source. The instructions for determining the frequency of the target signal at the first collector may include instructions for receiving data based upon, at least in part, a digitized representation of the target signal from the first collector. The instructions for receiving the data based upon, at least in part, the digitized representation of target signal may include instructions for receiving the digitized representation modulated onto the reference carrier signal.

Determining the intended frequency of the reference carrier signal may be based upon, at least in part, determining a predetermined intended frequency of the reference carrier signal. The instructions for determining the intended frequency of the reference carrier signal may include instructions for receiving the reference carrier signal. The frequency of the received reference carrier signal may be determined based upon, at least in part, the first reference timebase source. The instructions for receiving the reference carrier signal may include instructions for receiving the reference carrier signal at the first collector.

The first collector may be moving relative to a source of the target signal. Instructions may further be included for determining a first state vector associated with the first collector, the first state vector including position and velocity information associated with the first collector. A relative movement between the first collector and the second collector may be determined based upon, at least in part, the first state vector. Calculating the relative timebase error may include compensating for a frequency shift based upon, at least in part, the relative movement between the first collector and the second collector. The second collector may be moving relative to the source of the target signal. Instructions may further be included for determining a second state vector associated with the second collector, the second state vector including position and velocity information associated with the second collector. Determining the relative movement between the first collector and the second collector may be based upon, at least in part the first state vector and the second state vector. Calculating the relative timebase error may include compensating for the frequency shift based upon, at least in part, the relative movement between the first collector and the second collector.

Instructions may further be included for geolocating a source of the target signal based upon, at least in part, calculated time difference of arrival and frequency difference of arrival of the target signal at the first collector and at the second collector and based upon, at least in part, the calculated corrected frequency difference for the target signal.

According to another implementation, a computing system may include a processor and a memory module coupled with the processor. The processor may be configured for determining a frequency of a target signal at a first collector based upon, at least in part, a first reference timebase source associated with the first collector. An intended frequency of a reference carrier signal at the first collector may be determined based upon, at least in part, the first reference timebase source associated with the first collector. The processor may also be configured for determining a frequency of the target signal at a second collector based upon, at least in part, a second reference timebase source associated with the second collector. An observed frequency of the reference carrier signal at the second collector may be determined based upon, at least in part, the second reference timebase source associated with the second collector. A relative timebase error between the first collector and the second collector may be calculated based upon, at least in part, a difference between the intended frequency of the reference carrier signal and the observed frequency of the reference carrier signal. The processor may also be configured for calculating a corrected frequency difference for the target signal based upon, at least in part, the relative timebase error and a proportional scaling factor.

One or more of the following features may be included. Determining the intended frequency of the reference carrier signal may include transmitting the reference carrier signal having the intended frequency based upon, at least in part, the first reference timebase source. Determining the frequency of the target signal at the first collector may include receiving data based upon, at least in part, a digitized representation of the target signal from the first collector. Receiving the data based upon, at least in part, the digitized representation of target signal may include receiving the digitized representation modulated onto the reference carrier signal.

Determining the intended frequency of the reference carrier signal may be based upon, at least in part, determining a predetermined intended frequency of the reference carrier signal. Determining the intended frequency of the reference carrier signal may include receiving the reference carrier signal. The frequency of the received reference carrier signal may be determined based upon, at least in part, the first reference timebase source. Receiving the reference carrier signal may include receiving the reference carrier signal at the first collector.

The first collector may be moving relative to a source of the target signal. The processor and memory module may be further configured for determining a first state vector associated with the first collector, the first state vector including position and velocity information associated with the first collector. A relative movement between the first collector and the second collector may be determined based upon, at least in part, the first state vector. Calculating the relative timebase error may include compensating for a frequency shift based upon, at least in part, the relative movement between the first collector and the second collector. The second collector may be moving relative to the source of the target signal. The processor and memory module may be further configured for determining a second state vector associated with the second collector, the second state vector including position and velocity information associated with the second collector. Determining the relative movement between the first collector and the second collector may be based upon, at least in part the first state vector and the second state vector. Calculating the relative timebase error may include compensating for the frequency shift based upon, at least in part, the relative movement between the first collector and the second collector.

The processor and memory module may be further configured for geolocating a source of the target signal based upon, at least in part, calculated time difference of arrival and frequency difference of arrival of the target signal at the first collector and at the second collector and based upon, at least in part, the calculated corrected frequency difference for the target signal.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
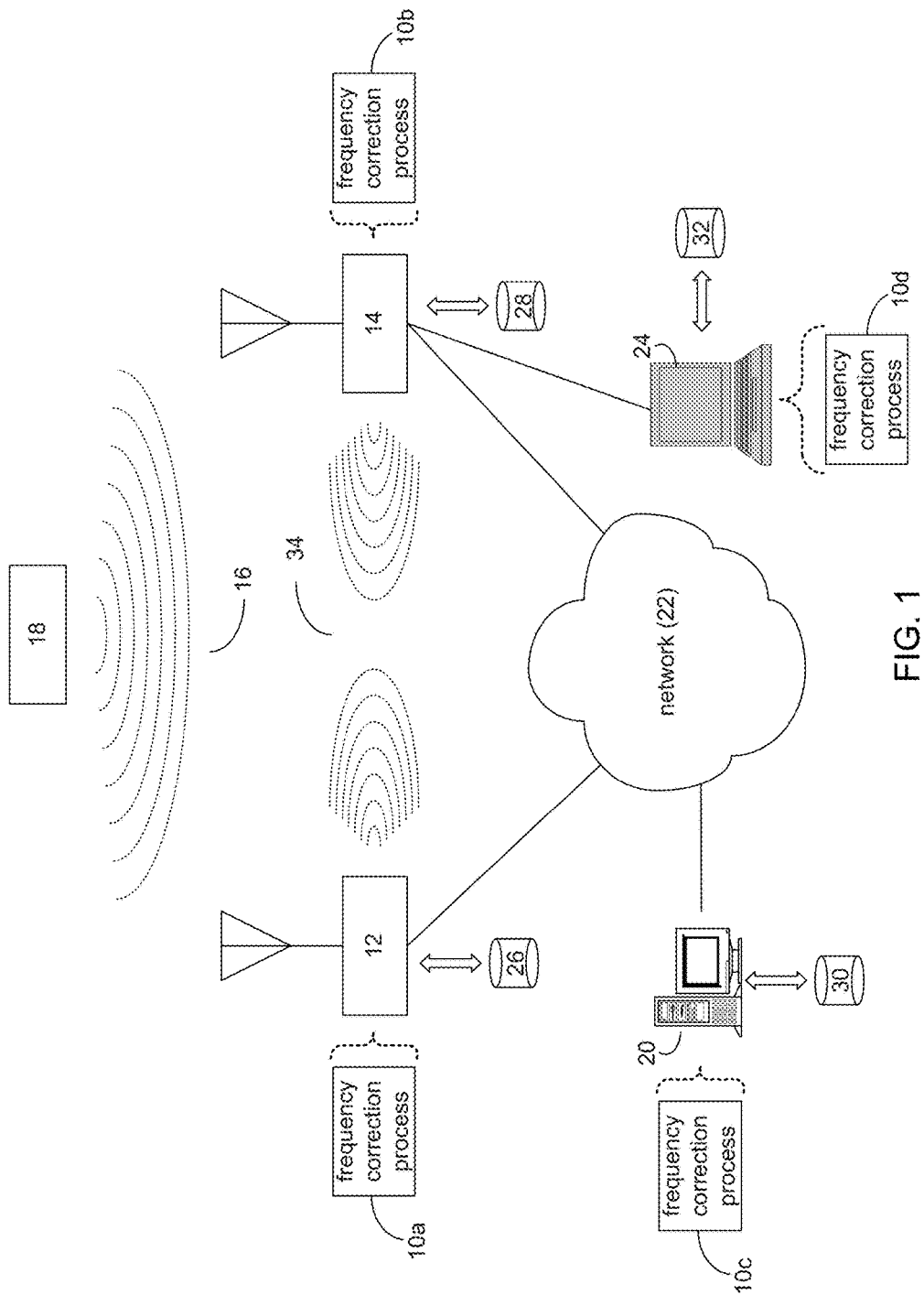
FIG. 1 is a diagrammatic view of an implementation of a frequency correction process of the present disclosure, according to an example embodiment.

Generally, geolocating a source of a target signal using frequency difference of arrival and time difference of arrival techniques requires accurate measurement of the frequency of the target signal by each of the listening posts, or signal collectors. Consistent with implementations of the present disclosure, systems and methods for correcting relative frequency errors between multiple collectors may be provided. Correcting frequency errors between the multiple collectors consistent with the present disclosure may obviate the need for very accurate reference timebase sources, such as Rubidium-based atomic clocks, for quantifying the frequency of the target signal by each collector. In some implementations, the frequency error correction may provide a frequency measurement of the target signal having an accuracy that may be generally of the level of obtainable through the use of atomic clocks by each collector, while allowing for the use of reference timebase sources at each collector that are relatively less expensive, smaller, lighter, and more power efficient than conventional high accuracy timebase references. In some implementations, the frequency error correction may allow transmissions sources of target signals to be geolocated without utilizing a cooperative reference beacon transmitter that is separate and apart from the collectors that receive the target signal for geolocation. Further, in some implementations, the frequency error correction may be applied separate from time difference of arrival/frequency difference of arrival computations. For example, the frequency error correction may be carried out prior to, and/or separate from, geolocation computations. Additionally, in some embodiments, frequency error correction consistent with the present disclosure may be applied to target signals of any frequency that may be received by the collectors.

According to various implementations, frequency error correction may be implemented either in real-time, or near real-time, with the collection of the target signal, or may be implemented in post processing, at some time after the collection of the target signal. In one implementation, two collectors may each collect a target signal whose source is to be located. A downlink transmission from one collector to the other may be utilized. In general, the downlink transmission may be based upon, at least in part, a reference timebase source at the collector transmitting the downlink transmission. The reference timebase source may be the same reference timebase source that is used to determine the frequency of the target signal by the collector. For example, the transmitter of the downlink transmission and the receiver of the target signal may be phase locked with a common reference timebase source. Similarly, the frequency of the target signal and the frequency of the downlink transmission may each be determined by receivers at the other collector that are phase locked with a common reference timebase source on that receiving collector. The relative frequency error between the two collectors may generally be proportional to the difference between the intended frequency of the downlink transmission (e.g., the frequency at which the transmitting collector perceived the downlink transmission to have been) and the observed frequency of the downlink transmission by the other collector (e.g., the frequency of the downlink transmission determined by the other collector). In an embodiment, the frequency error correction may be measured in unitless ratio. In such an embodiment, the frequency error correction may be applied to target signals at any frequency, irrespective of the band of the downlink transmission between the collectors. In some situations, utilizing a downlink transmission carrier at a relatively high frequency may allow attenuation of typical frequency measurement errors, for example, when applied to lower frequencies of target signals.

Referring to FIG. 1, there is shown frequency correction process 10. For the following discussion, it is intended to be understood that frequency correction process 10 may be implemented in a variety of ways. For example, frequency correction process 10 may be implemented through, or in connection with, a variety of hardware devices and/or configurations. Additionally, in some embodiments frequency correction process 10 may be implemented through a variety of hardware devices, wherein one or more different hardware devices may provide the same, or different functionality of frequency correction process 10 as may be provided by other hardware devices.

Figure 2:
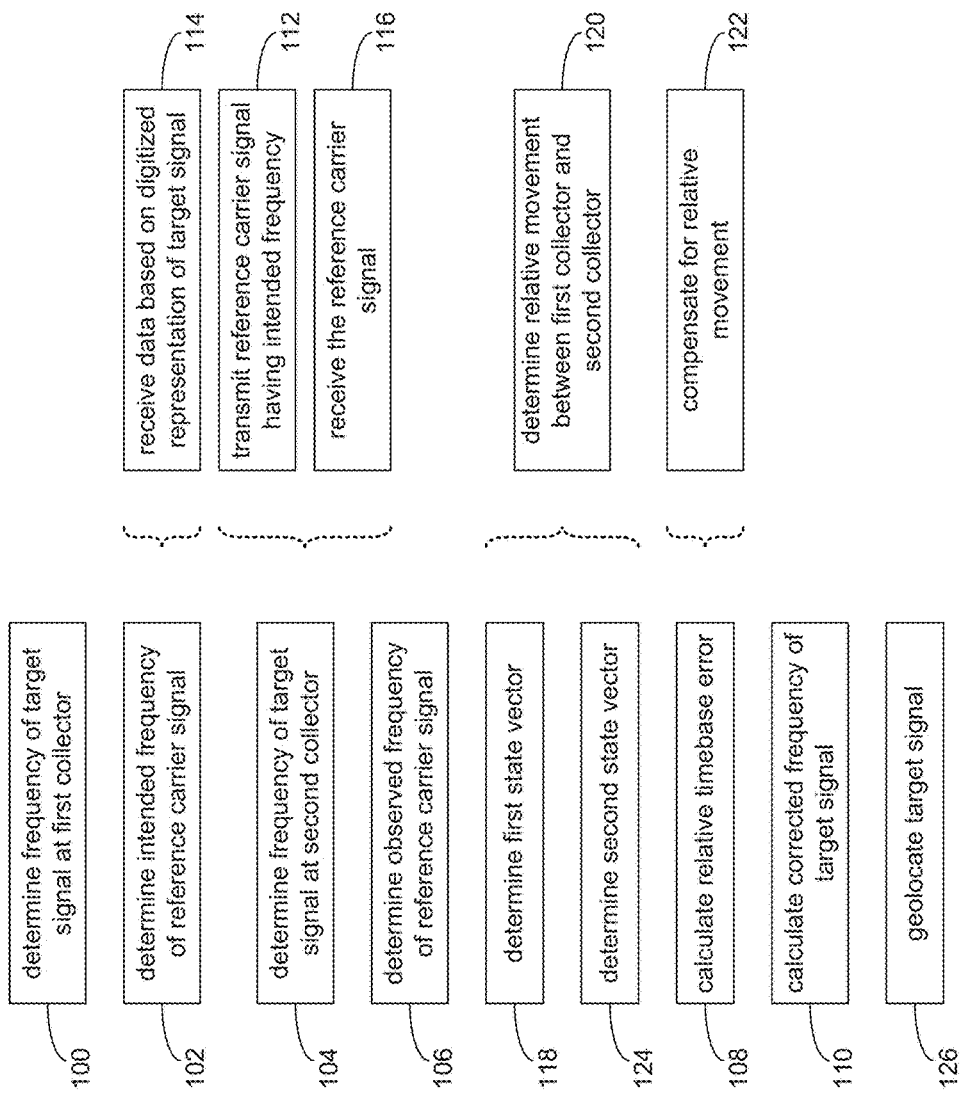
FIG. 2 is a flowchart of the frequency correction process of FIG. 1, according to an implementation of the present disclosure.

Referring also to FIG. 2, and as will be discussed in detail below, frequency correction process 10 may determine 100 a frequency of a target signal at a first collector based upon, at least in part, a first reference timebase source associated with the first collector. Frequency correction process 10 may further determine 102 an intended frequency of a reference carrier signal at the first collector based upon, at least in part, the first reference timebase source associated with the first collector. Frequency correction process 10 may also determine 104 a frequency of the target signal at a second collector based upon, at least in part, a second reference timebase source associated with the second collector. Frequency correction process 10 may determine 106 an observed frequency of the reference carrier signal at the second collector based upon, at least in part, the second reference timebase source associated with the second collector. Frequency correction process 10 may calculate 108 a relative timebase error between the first collector and the second collector based upon, at least in part, a difference between the intended frequency of the reference carrier signal and the observed frequency of the reference carrier signal. Frequency correction process 10 may further calculate 110 a corrected frequency difference for the target signal based upon, at least in part, the relative timebase error and a proportional scaling factor.

With continued reference to the illustrative configuration of FIG. 1, frequency correction process 10 may be implemented as one or more of frequency correction process 10*a*, 10*b*, 10*c*, and 10*d*. Consistent with the illustrated configuration, frequency correction process 10*a* may be implemented by a first signal collector (e.g., first collector 12) and frequency correction process 10*b* may be implemented by a second signal collector (e.g., second collector 14). In general, first collector 12 and second collector 14 may each receive a target radio transmission signal (e.g., target signal 16) transmitted by a source 18 of target signal 16. In general, target signal 16 may be any radio frequency transmission.

In addition/as an alternative to first collector 12 and second collector 14, frequency correction process 10 may be implemented as frequency correction process 10*c*, and/or frequency correction process 10*d*. As shown, frequency correction process 10*d* may be implemented by a computing device (such as computing device 20), which may communicate with one or more of first collector 12 and second collector 14 via network 22. Network 22 may include, but is not limited to, a direct communication channel between computing device 20 and one or more of first collector 12 and second collector 14, the Internet, a local area network, and/or another computing network. Further, in the illustrative example, frequency correction process 10*d* may be implemented through a computing device (e.g., notebook computer 24). Notebook computer 24 may coupled with (and/or otherwise communicate with) one or more of first collector 12 and/or second collector 14. While particular example computing devices (namely computing device 20 and notebook computer 24) have been shown, various additional and/or alternative computing devices may be utilized. Such computing devices may include, but are not limited to, a personal computer, a laptop computer, a mobile computing device, a table computing device, and a dedicated hardware device.

The instruction sets and subroutines of frequency correction process 10 (e.g., as implemented as one or more of frequency correction processes 10*a*, 10*b*, 10*c*, 10*d*) may be stored on one or more storage devices (e.g., storage devices 26, 28, 30, 32) coupled to one or more of first collector 12, second collector 14, computing device 20, and notebook computer 24, and may be executed by one or more processors (not shown) and one or more memory architectures (not shown) included within one or more of first collector 12, second collector 14, computing device 20, and notebook computer 24. Examples of storage device 26, 28, 30, 32 may include but are not limited to: a hard disk drive; a solid state drive, a tape drive; an optical drive; a RAID device; an NAS device, a Storage Area Network, a random access memory (RAM); a read-only memory (ROM); and all forms of flash memory storage devices.

In an implementation, first collector 12 and second collector 14 may communicate with one another, e.g., via wireless communication channel 34. Wireless communication channel 34 may include any suitable wireless communication channel, including a mono-directional communication channel (e.g., via which first collector 12 may communicate with second collector 14) and/or a bidirectional communication channel. Wireless communication channel 34 may be implemented through any appropriate hardware configurations that may provide for wireless communication between first collector 12 and second collector 14. In some embodiments, one or more additional data transport mechanisms may be utilized for communicating data between first collector 12 and second collector 14, either in a mono-directional and/or a bidirectional manner. Examples of suitable data transport mechanisms may include, but are not limited to, a wired communication channel (e.g., via network 22 and/or via a direct wired connection), an optical communication channel, physical data medium transport (e.g., including the physical transport of a data bearing medium such as a hard drive, a flash drive, an optical disc, etc.). Various additional and/or alternative data transport mechanism may be implemented for conveying data between first collector 12 and second collector 14, and/or between one or both of first collector 12 and second collector 14 and another computing device (such as computing device 20, notebook computer 24, etc.).

While frequency correction process 10 has been shown as including one or more possible implementations (e.g., frequency correction processes 10*a*, 10*b* 10*c*, 10*d*) it will be understood that a greater or fewer number of implementations may be utilized. Further, it will be understood that one or more of frequency correction process 10*a*, 10*b*, 10*c*, 10*d* may perform all of the functionality of frequency correction process, may each perform some of the same functionality of frequency correction process 10, and/or may perform different functionality of frequency correction process 10.

As generally discussed above with reference to FIG. 2, frequency correction process 10 may determine 100 a frequency of a target signal at a first collector based upon, at least in part, a first reference timebase source associated with the first collector. Frequency correction process 10 may further determine 102 an intended frequency of a reference carrier signal at the first collector based upon, at least in part, the first reference timebase source associated with the first collector. Frequency correction process 10 may also determine 104 a frequency of the target signal at a second collector based upon, at least in part, a second reference timebase source associated with the second collector. Frequency correction process 10 may determine 106 an observed frequency of the reference carrier signal at the second collector based upon, at least in part, the second reference timebase source associated with the second collector. Frequency correction process 10 may calculate 108 a relative timebase error between the first collector and the second collector based upon, at least in part, a difference between the intended frequency of the reference carrier signal and the observed frequency of the reference carrier signal. Frequency correction process 10 may further calculate 110 a corrected frequency difference for the target signal based upon, at least in part, the relative timebase error and a proportional scaling factor.

Figure 3:
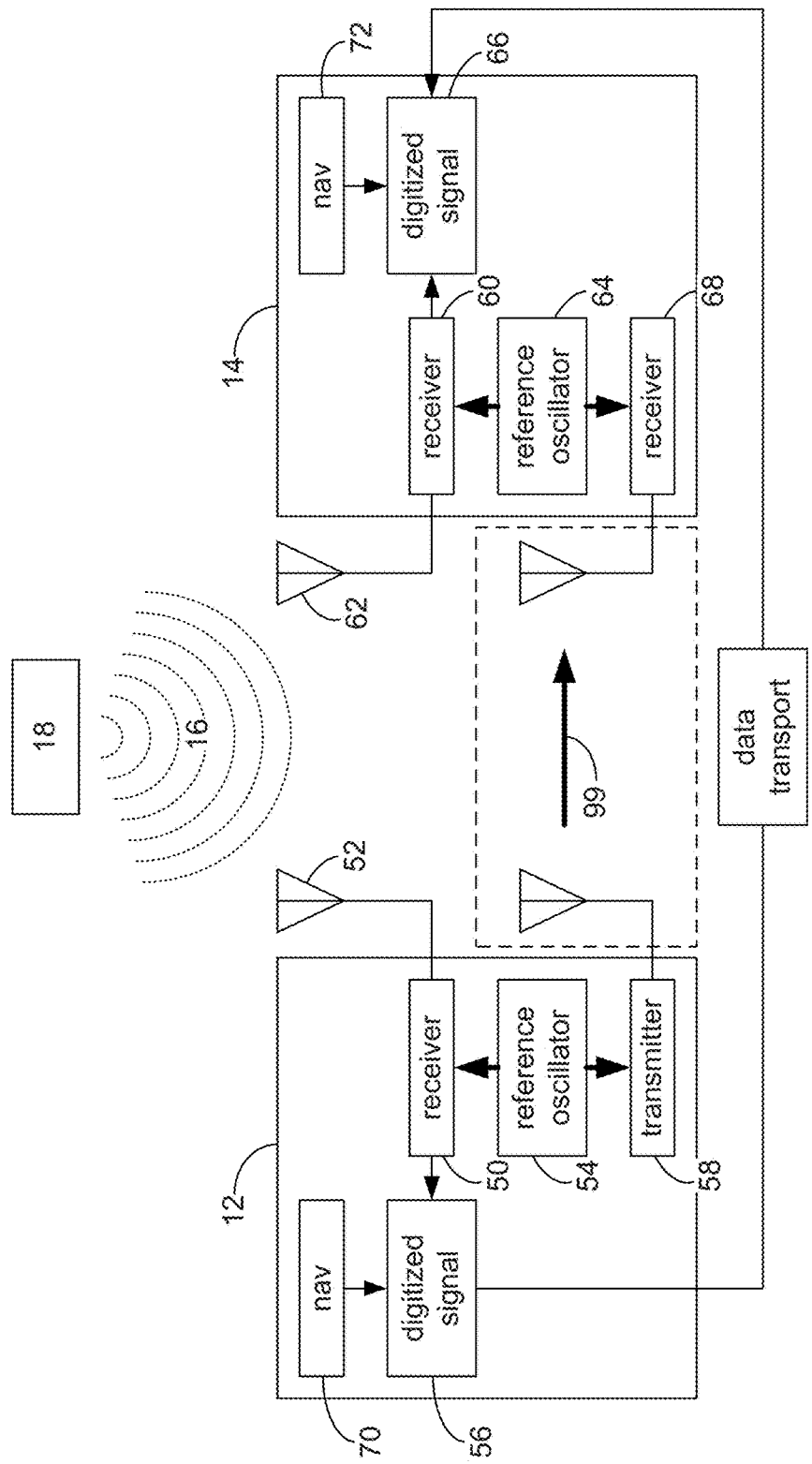
FIG. 3 diagrammatically depicts an implementation of the frequency correction process of FIG. 1, according to an example embodiment.

For example, and referring also to FIG. 3, in an illustrative embodiment, first collector 12 and second collector 14 may each receive target signal 16 for target source 18. The frequency of target signal 16 may be determined 100, 104 at each of first collector and second collector based upon, at least in part, a respective reference timebase source at each of first collector 12 and second collector 14. Further, a reference carrier signal 99 may be transmitted between first collector 12 and second collector 14. First collector 12 may generally set the transmitted reference carrier signal to an intended frequency based upon, at least in part, the reference timebase source of first collector 12. The frequency of the reference carrier signal, as observed by second collector 14 based upon, at least in part, the reference timebase source of second collector 14 may be determined 106. The difference between the intended frequency of the reference carrier signal (which may have been determined 102 based upon, at least in part the reference timebase source of first collector 12) and the observed frequency of the reference carrier signal (which may have been determined 106 based upon, at least in part, the reference timebase source of second collector 14) may allow a relative timebase error between the reference timebase source of first collector 12 and reference timebase source of second collector 14 to be calculated 108.

For example, target signal 16 may be received by receiver 50 of first collector 12, via associated antenna 52. Frequency correction process 10 may determine 100 a frequency of target signal 16 at first collector 12 based upon, at least in part, a first timebase reference source associated with first collector 12. For example, first collector 12 may include reference oscillator 54 as the first reference timebase source. Examples of reference oscillator 54 may include, but are not limited to, crystal oscillators, Temperature Compensated Crystal Oscillators (TCXO), Ovenized Crystal Oscillators (OCXO), or atomic frequency sources, to include Cesium and Rubidium. For example, receiver 50 may be phase locked with reference oscillator 54, as a reference timebase source. As such, the frequency of target signal 16 may be determined 100 based upon, at least in part, a timebase signal provided by reference oscillator 54. The received target signal 16 may be digitized (e.g., by receiver 50 and/or another device) and may be buffered as digitized signal 56.

First collector 12 may also transmit a reference carrier signal 99, e.g., via transmitter 58, to second collector 14. Frequency correction process 10 may determine 102 an intended frequency of the reference carrier signal based upon, at least in part, the first reference timebase source (e.g., reference oscillator 54 associated with first collector 12). Determining 102 the intended frequency of the reference carrier signal may include transmitting the reference carrier signal having the intended frequency based upon, at least in part, the first reference timebase source. For example, transmitter 58 may be phased locked with reference oscillator 54, and may set the frequency of the reference carrier signal based a timebase signal from reference oscillator 54. In an embodiment, the frequency of the reference carrier signal may have been defined prior to the transmission of the reference carrier signal. In the foregoing manner, determining 102 the intended frequency of the reference carrier signal may be based upon, at least in part, identifying the predetermined intended frequency of the reference carrier signal, and transmitting 112 the reference carrier signal from first collector 12 at that predetermined intended frequency. In addition/as an alternative to a predetermined intended frequency, reference carrier signal information may be provided as to the intended frequency of the reference carrier signal. For example, data including the intended frequency of the reference carrier signal may be modulated onto the reference carrier signal. As such, a receiver capable of receiving the data may determine the intended frequency of the reference carrier signal.

Further, and in a similar manner as discussed with respect to first collector 12, frequency correction process 10 may determine 104 the frequency of target signal 16 at second collector 14. For example, second collector 14 may receive target signal 16 via receiver 60 and antenna 162 associated with second collector 14. Frequency correction process 10 may determine 104 the frequency of target signal 16 at second collector 14 based upon, at least in part, a second reference timebase sources (e.g., reference oscillator 64) associate with second collector 14. For example, receiver 60 may be phase locked with reference oscillator 64. The frequency of the received target signal at second collector 14 may, therefore, be determined 104 based upon, at least in part, reference oscillator 64. In an embodiment, target signal 16 received at second collector 14 may be digitized and may be buffered as digitized signal 66.

Further, frequency correction process 10 may determine 106 an observed frequency at second collector 14 of the reference carrier signal transmitted by first collector 12. In an embodiment, determining 102 the intended frequency of the reference carrier signal 99 may include receiving 116 the reference carrier signal. For example, the reference carrier signal may be received at second collector 14 via receiver 68. In an embodiment, receiver 68 may also be phase locked with reference oscillator 64. Accordingly the observed frequency of the reference carrier signal at second collector 14 may be determined 106 based upon, at least in part, the second reference timebase source (e.g., reference oscillator 64) associated with second collector 14. It may be appreciated that, due to timebase errors in one or both of reference oscillator 54 (e.g., based upon which the reference carrier signal was transmitted) and reference oscillator 64 (e.g., based upon which the frequency of the received reference carrier signal may be determined), the determined frequency of the reference carrier signal may be different than the predetermined frequency for the reference carrier signal. In an embodiment, the observed frequency of reference carrier signal at second collector 14 may include the determined 106 frequency of the reference carrier signal based upon reference oscillator 64.

As generally described above, frequency correction process 10 may be implemented as one or more of frequency correction process 10a, 10b, 10c, 10d. In an embodiment in which frequency correction process may be implemented, at least in part, as frequency correction process 10a at first collector 12 and as frequency correction process 10b at second collector 14, frequency correction process 10 may determine 100 the frequency of target signal 16 at first collector 12, directly, and may determine 104 the frequency of target signal 16 at second collector 14 directly. In an implementation in which frequency correction process 10 may be implemented at, for example, second collector 14 as frequency correction process 10b, determining 100 the frequency of target signal 16 at first collector 12 may include receiving 114 data based upon, at least in part, a digitized representation of target signal 16 from first collector 12. For example, as described above, target signal 16 received at first collector 12 may be digitized and buffered as digitized signal 56, which may include, in part, a digitized representation of target single 16 received at first collector 12. Digitized signal 56 may include, for example, the frequency of target signal 16 based upon, at least in part, the first reference timebase source (e.g., reference oscillator 54), a precise time at which target signal was received by first collector 12, etc. The data based upon, at least in part, digitized signal 56 may be received 114 via a variety of mechanisms. For example, digitized signal 56 may be modulated onto the reference carrier signal 99. As such, the digitized representation of target signal 16 received at first collector 12 (e.g., which may include a determined frequency of target signal at first collector 12 based upon, at least in part, reference oscillator 54 and a time at which target signal was received at first collector) may be received 114 at second collector 14 via receiver 68. In other embodiments, the data based upon the digitized representation of target signal 16 received at first collector 12 may be received 114 via other mechanisms, such as via network 22, via transport of physical media, etc.

Frequency correction process 10 may calculate 108 a relative timebase error between the first collector and the second collector based upon, at least in part, a difference between the intended frequency of the reference carrier signal and the observed frequency of the reference carrier signal. For example, and as generally discussed above, an intended frequency of the reference carrier signal may be determined 102 based upon, at least in part the first reference timebase source (e.g., reference oscillator 54). For example, the reference carrier signal may be transmitted from first collector 12 at the intended frequency by transmitter 58, which may be phase locked with reference oscillator 54. To the extent that reference oscillator 54 include any inaccuracies, the reference carrier signal that is transmitted by transmitter 58 may have an actual frequency that is different than the intended frequency. Further, the observed frequency of the reference carrier signal may be determined 106 based upon, at least in part, the second reference timebase source (e.g., reference oscillator 64). To the extent that reference oscillator 64 includes any inaccuracies the observed frequency of the reference carrier signal (e.g., the perceived frequency of the reference carrier signal received by receiver 68, based upon, at least in part, reference oscillator 64) may be different from the actual frequency of the reference carrier signal. The combination of inaccuracies of reference oscillator 54 and reference oscillator 64 may be the relative timebase error between first collector 12 and second collector 14.

For example, assume for illustrative purposes that the intended frequency of the reference carrier signal is 900 MHz. Transmitter 58 may transmit a reference carrier signal having a determined 102 intended frequency of 900 MHz based upon, at least in part, a timebase signal from reference oscillator 54. Further, receiver 68 may receive the reference carrier signal at a determined 106 of 903 MHz. As such, the relative timebase error between first collector 12 and second collector 14 may be 3 MHz. It will be appreciated that the 3 MHz relative timebase error could be attributable to timebase errors associated with one, or both of reference oscillator 54 and reference oscillator 64. In an embodiment, calculating 108 the relative timebase error between first collector 12 and second collector 14 may include scaling the raw error based on the frequency of the reference carrier signal. For example, if the intended frequency of the reference carrier signal if F1, and the observed frequency of the reference carrier signal is F2, the relative timebase error may be represented as a unitless ratio equal to the difference between the intended and observed frequency of the reference carrier wave over the intended frequency of the reference carrier wave, or (F1 −F2)/F1. Continuing with the above example, error ratio may equal (900 MHz-903 MHz)/900 MHz. As the such error ratio may equal −33 parts per 10 000. It will be appreciated that the foregoing example is intended only for illustrative purposed and should not be construed as being limiting on, or indicative of, a representative error ratio.

In an embodiment one, or both, of first collector 12 and second collector 14 may be moving relative to source 18 of the target signal 16. Further, first collector 12 and second collector 14 may be moving relative to one another. As such, calculating 108 the relative timebase error between first collector 12 and second collector 14 may consider the kinematics of the relative motion between first collector 12 and second collector 14. For example, the relative motion between first collector 12 and second collector 14 may result in a Doppler frequency shift in the reference carrier signal 99 between first collector 12 and second collector 14. In an embodiment, one of the intended frequency of the reference carrier signal and the observed frequency of the reference carrier signal may be adjusted to account for the kinematic frequency shift.

Consistent with the foregoing, frequency correction process 10 may determine 118 a first state vector associated with first collector 12. The first state vector may include a position of first collector when the reference carrier signal is transmitted from first collector 12 to second collector 14. For example, first collector may include navigational sensor 70, such as a GPS receiver or the like, which may determine the position of first collector 12 and the velocity (e.g., direction and speed of movement) of first collector 12. In an embodiment, the first state vector may be transported to second collector 14, and/or another device implementing error correction process 10. For example, the first state vector may be combined with digitized signal 56 and may be transported along with digitized signal 56. In an embodiment, the first state vector and digitized signal may be modulated onto the reference carrier signal and transmitted to second collector 14.

Consistent with such an embodiment, error correction process 10 may include determining 120 a relative movement between first collector 12 and second collector 14 based upon, at least in part, the first state vector. Accordingly, calculating 108 the relative timebase error may include compensating 122 for a frequency shift based upon, at least in part, the relative movement between first collector 12 and second collector 14. As generally discussed above, compensating 122 for the frequency shift may include adjusting one of the intended frequency of the reference carrier signal and the observed frequency of the reference carrier signal.

Further, in addition, or as an alternative to, the movement of first collector 12 relative to source 18 of target signal 16, second collector 14 may be moving relative to source 18 of target signal 16. Frequency correction process 10 may determine 124 a second state vector associated with second collector 14. The second state vector may include position and velocity information associated with second collector 14. In a generally similar manner as discussed above, second collector 14 may include navigational sensor 72, such as a GPS receiver or the like, which may determine the position of second collector 14 and the velocity (e.g., direction and speed of movement) of second collector 14. In an embodiment, the second state vector may be combined with digitized signal 66.

Determining 120 the relative movement between first collector 12 and second collector 14 may be based upon, at least in part the first state vector and the second state vector. In such an embodiment, frequency correction process 10 may calculate 108 the relative timebase error including compensating for the frequency shift based upon, at least in part, the relative movement between first collector 12 and second collector 14. Accordingly, calculating 108 the relative timebase error may include compensating 122 for a frequency shift based upon, at least in part, the relative movement between first collector 12 and second collector 14. As generally discussed above, compensating 122 for the frequency shift may include adjusting one of the intended frequency of the reference carrier signal and the observed frequency of the reference carrier signal.

Frequency correction process 10 may further calculate 110 a corrected frequency difference for the target signal based upon, at least in part, the relative timebase error and a proportional scaling factor. For example, because the first reference timebase source (e.g., reference oscillator 54) is phase locked with receiver 50 and with transmitter 58, the frequency of target signal 16 may be determined 100 at first collector 12 based upon, at least in part, reference oscillator 54, and the intended frequency of the reference carrier signal may be determined 102 based upon, at least in part, reference oscillator 54. Therefore, any timebase error associated with the intended reference carrier signal may be proportionally associated with the determined 100 frequency of target signal 16 at first collector 12. Similarly, because the second reference timebase source (e.g., reference oscillator 64) is phase locked with receiver 60 and receiver 68, the frequency of target signal 16 may be determined 104 at second collector 14 based upon, at least in part, second reference oscillator 64, and the observed frequency of the reference carrier signal may be determined 106 based upon, at least in part, reference oscillator 64. Therefore, any timebase error associated with the observed frequency of the reference carrier signal may be proportionally associated with the determined 104 frequency of target signal 16 at second collector 14.

For example, the difference in the frequency of target signal 16 determined 100 at first collector 12 and determined 104 at second collector 14 may be based upon, at least in part, the difference in relative motion of first collector 12 to source 18 and relative motion of second collector 14 and source 18, as well as the relative timebase error between the first reference timebase source (e.g., reference oscillator 54) and the second reference timebase source (e.g., reference oscillator 64). The corrected frequency difference may be calculated 110 based upon, at least in part, the relative timebase error and a proportional scaling factor, for example, to apply the error correction at a ratio of the frequency of the target signal to frequency of the intended reference carrier signal. As described above, the relative scaling factor may be combined with the relative timebase error to provide a unitless error ratio equal to the difference between the intended frequency of the reference carrier signal (corrected for kinematics based on the relative movement of first collector 12 to second collector 14), F1, and the observed frequency of the reference carrier signal, F2, divided by the intended frequency of the reference carrier signal (corrected for kinematics), F1, namely error ratio= (F1−F2)/F1. The apparent difference between the frequency of the target signal determined 100 at first collector 12 and the frequency of the target signal determined 104 at second collector 14 may be based upon, at least in part, a cross-correlation comparison of digitized signal 56 and digitized signal 66. The required correction to the apparent frequency difference may be equal to F3 times (F1−F2)/F1, where F3 is the frequency at which the target signal is transmitted. This correction may also be considered as the apparent error in the reference carrier signal (F1−F2) times F3/F1, where F3/F1 serves to scale the error based on the ratio of the frequency of target signal 16 to the frequency of the reference carrier signal. Continuing with the previous example of a 900 MHz intended reference carrier and a determined 3 MHz error, applying this error scaled to a 300 MHz target signal may give an error rate on the order of 1 MHz (e.g., 300 MHz/900 MHz may yield a ⅓ proportional error in the target signal based on the same relative timebase errors of reference oscillators 54, 64).

Consistent with the foregoing, because the error correction may be scaled, and therefore applied at a proportional rate based on the frequency of the target signal, it is not necessary that target signal 16 be in the same band as the reference carrier signal. Further, the apparent error of the reference carrier signal (e.g., F1-F2) may be scaled by the fraction (F3/F1). In some situations, a significant portion of the error in estimating a carrier signal frequency may be based upon, at least in part, the time of observation and signal to noise ratio of the signal, both of which may be independent of the carrier frequency. Accordingly, by selecting the intended frequency of the reference carrier signal (e.g., F1) to be higher than the frequency of target signal 16 (e.g., F3), it may be possible to attenuate some, or most, of the random errors in the measurement of the observed frequency of the reference carrier signal (e.g., F2).

Frequency correction process 10 may further geolocate 126 source 18 of target signal 16 based upon, at least in part, a calculated time difference of arrival and frequency difference of arrival of target signal 16 at first collector 12 and at second collector 14 and based upon, at least in part, the calculated corrected frequency difference for the target signal. For example, the corrected determined 100, 104 frequency of target signal at first collector 12 and second collector 14 may be utilized in geolocation of source 18 of target signal 16 using known frequency difference of arrival and time difference of arrival geolocation techniques, and/or utilizing other geolocation techniques.

Figure 4:
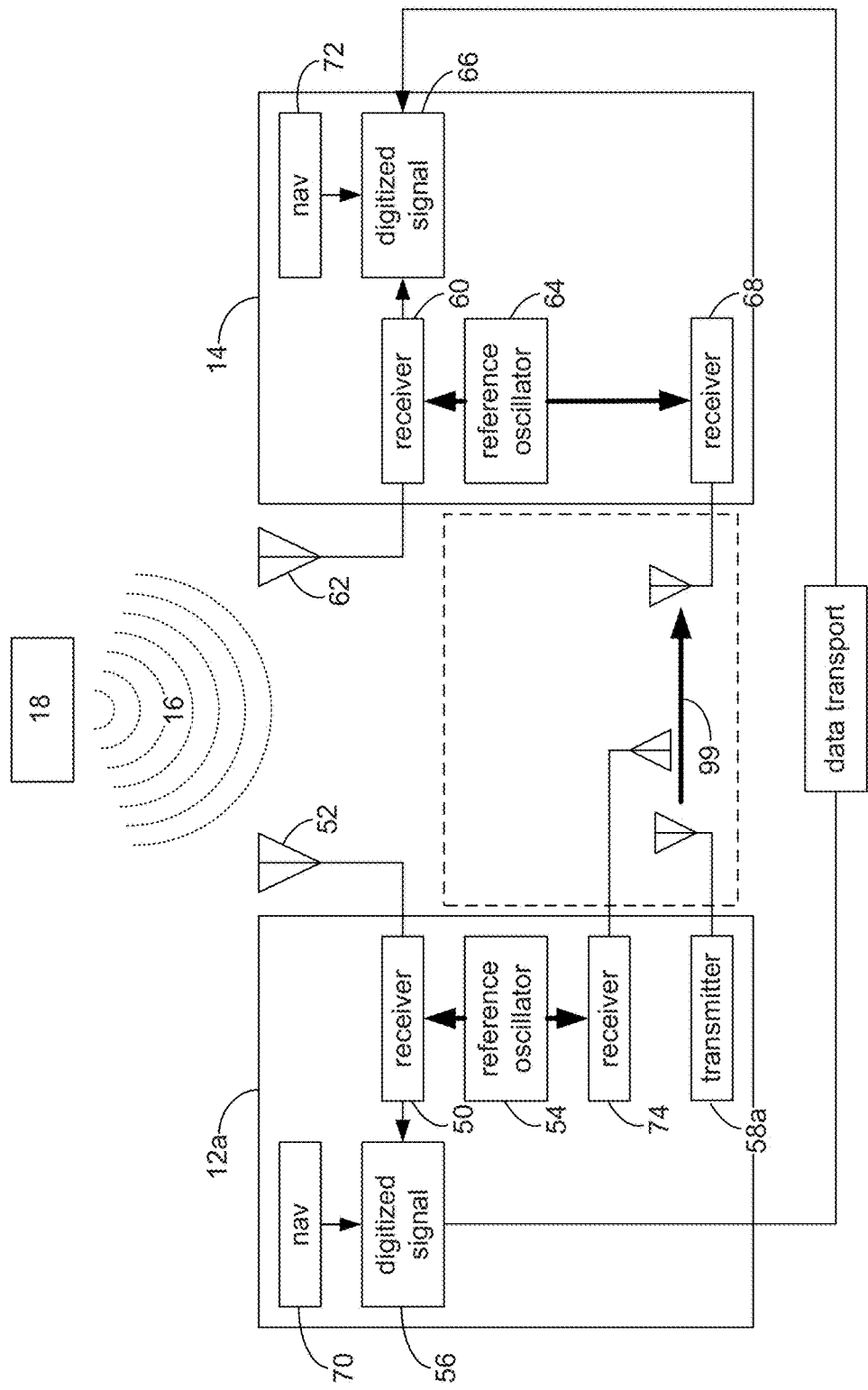
FIG. 4 diagrammatically depicts another implementation of the frequency correction process of FIG. 1, according to an example embodiment.

Referring also to FIG. 4, in an example implementation, frequency correction process 10 may be utilized in connection with a hardware configuration of the first collector (e.g. first collector 12*a*) in which, for example, a transmitter (e.g., transmitter 58*a*) may not be configured to be phase locked with a reference timebase source (e.g., reference oscillator 54). For example, frequency correction process 10 consistent with FIG. 4 may be implemented in connection with existing hardware, e.g., which may not have been specifically configured for implementing frequency correction process 10. For example, it may often be the case that a radio surveillance package may include multiple receivers that may be coupled with a common reference timebase sources, for example for obtaining directional observation. One or more of the receivers coupled with the common timebase reference source may be utilized in connection with frequency correction process 10.

As shown in FIG. 4, first collector 12*a* may include a receiver (e.g., receiver 74) that may be phase locked with the first reference timebase source (e.g., reference oscillator 54), in addition to receiver 50, which receives target signal 16. In an embodiment, transmitter 58*a*, which may not be phase locked with reference oscillator 54, may transmit the reference carrier signal, e.g., to second collector 14. In some embodiments, digitized signal 56 (including a digitized representation of target signal 16 received at first collector 12*a*) may be modulated onto the reference carrier signal, e.g., for communicating the digitized representation of target signal 16 to second collector 14. The reference carrier signal may be transmitted at a predetermined intended frequency. Consistent with the embodiment of FIG. 4, the transmitted reference carrier signal may be received 116 by receiver 74 of first collector 12*a*. As shown, receiver 74 may be phase locked with reference oscillator 54, which may also be phase locked with receiver 50 that receives target signal 16 at first collector 12*a*.

Consistent with the foregoing example, determining 102 the intended frequency of the reference carrier signal may further include determining the frequency of the received reference carrier signal based upon, at least in part, the first reference timebase source. As shown, receiving 116 the reference carrier signal may include receiving the reference carrier signal at the first collector. Receiving 116 the reference carrier signal by receiver 74 may allow the intended frequency of the reference carrier signal to be determined 102 based upon, at least in part, reference oscillator 54. In an embodiment, the received reference carrier signal may be digitized, and may be buffered with digitized signal 56. Further, the digitized received reference carrier signal may be communicated to second collector 14, and/or to another device. For example, the digitized received reference carrier signal may be modulated onto the reference carrier signal along with the digitized copy of the received target signal. As discussed above, digitized signal 56 (e.g., which may include the digitized received reference carrier signal) may be otherwise communicated to second collector 14 and/or to another device. In a generally similar manner as described above, determining the kinematic adjusted difference between the reference carrier signal received 116 at first collector 12*a* and the reference carrier signal received at second collector 14, a relative timebase error between reference oscillator 54 and reference oscillator 64 may be determined.

Figure 5:
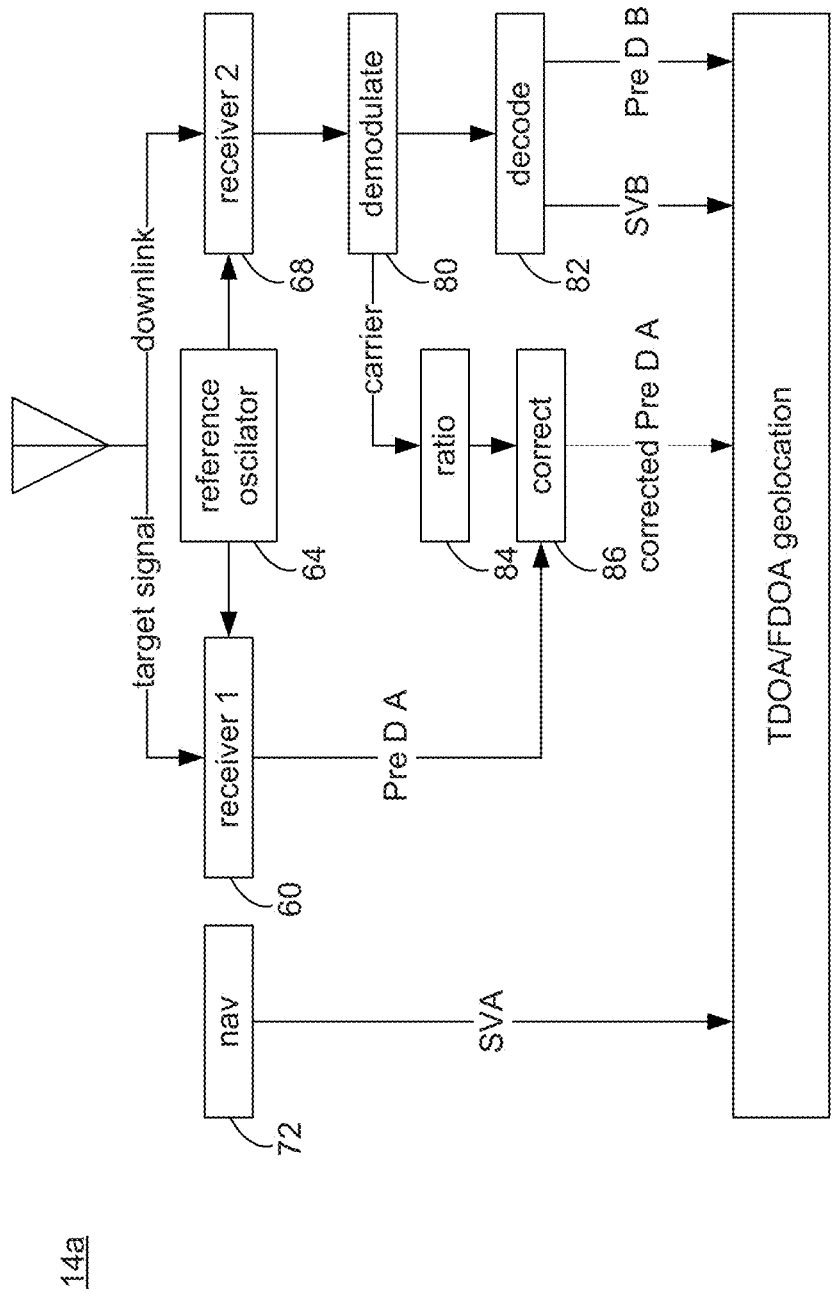
FIG. 5 diagrammatically depicts an implementation of the frequency correction process of FIG. 1, according to an example embodiment.

In some situations one, or both, of the reference timebase sources associated with the first collector or the second collector may provide an unstable, or varying error. In an embodiment, frequency correction process 10 may provide frequency correction on an ongoing, real-time basis. Referring also to FIG. 5, an example implementation of frequency correction process 10 is shown, which may be used to provide ongoing, real-time frequency correction.

In particular embodiment shown in FIG. 5, both the downlink signal (which may include the reference carrier signal having the digitized signal from first collector 12 modulated onto the reference carrier signal) and target signal 16 may be received by second collector 14*a*. Target signal 16 and the downlink signal may each be passed to respective receivers (e.g., receivers 60, 68) which may each be phase locked with reference oscillator 64. The received downlink signal may be passed to demodulator 80, which may separate the reference carrier signal (e.g., carrier in FIG. 5) from the data modulated onto the downlink signal. The data modulated onto the downlink signal may be decoded by decoder 82, to obtain the state vector information associated with first collector 12 and the digitized representation of target signal 16 received at first collector 12 (i.e., the pre-detected signal, or Pre D B).

The frequency shifts of the reference carrier signal from demodulator 80 may be tracked based upon, at least in part, reference oscillator 64, and the relative timebase error between first collector 12 and second collector 14*a* may be scaled to the frequency of target signal 16 at ratio 84. Ratio 84 may, at least in part, determine the relative error between the intended frequency of the reference carrier (e.g., which may be modulated with the digitized signal 56 to create the downlink signal) and the observed frequency of the demodulated carrier at each instant of time to determine the raw error. The raw error may then be scaled (e.g., based upon, at least in part, the ratio of the frequency of target signal 16 to the intended carrier frequency) to determine a proportional error.

The scaled carrier errors may be applied to the digitized representation of target signal 16 received at second collector 14*a* (i.e., the pre-detected signal, or Pre D A) from receiver 60 at corrector 86. In an embodiment, corrector 86 may shift the frequency of the Pre D A wave form on a point-by-point basis over time based upon, at least in part, the varying relative timebase error between first collector 12 and second collector 14*a* over time. For example corrector 86 may implement a phase shifting process in which the phase of Pre D A is shifted by the scaled error phase of the reference carrier. In particular, the amount of phase shift applied to Pre D A may be based upon, at least in part, the ratio of the target signal frequency to the downlink frequency. It will be appreciated that as an alternative to applying error correction to signal Pre D A, the error correction may be applied to signal Pre D B, received at first collector 12 by applying the phase shift in the opposite direction. Persons familiar with the art will understand that phase corrections can effect frequency corrections since phase is the time derivative of frequency, and that the scaling must be applied to "unwrapped" phase.

The frequency corrected target signal (i.e., corrected Pre D A) and the state vector information associated with collector 14*a* from navigational sensor 72, along with the pre-corrected target signal from first collector 12 (i.e., Pre D B) and the state vector information from first collector (i.e., SVB) may be utilized for geolocating source 18 of target signal 16, utilizing conventional time difference of arrival and frequency difference of arrival techniques.

Consistent with the foregoing examples, frequency correction process 10 may be implemented in connection with existing radio hardware in which at least one signal collector may have a receiver for collecting environmental target signals which is phase locked with a transmitter that is capable of transmitting, e.g., a communication downlink or other reference carrier signal, and another signal collector including a receiver for collecting environmental target signals which is phase locked with a receiver that is capable of receiving communication downlink signals, or other reference carrier transmissions. Further, as generally described, in some embodiments at least a portion of frequency correction process 10 may be implemented at the first collector (e.g., determining 100 the frequency of the target signal at the first collector and determining 102 the intended frequency of the reference carrier signal), while other functionality of frequency correction process 10 may be performed at the second collector (e.g., determining 104 the frequency of the target signal at the second collector and determining 106 the observed frequency of the reference carrier signal). Calculating 108 the relative timebase error and calculating 110 the corrected frequency difference for the target signal may be implemented at the second collector and/or at another computing device (e.g., notebook computer 24, computing device 20, and/or another device). In still other implementations all of the functionality of frequency correction process 10 may be implemented at the second collector, and/or at another device (e.g., computing device 20, notebook computer 24, etc.), in real-time and/or asynchronously, e.g., during post processing. For example, the frequency of the target signal at the first collector may be determined 100 based upon digitized signal 56, which may be communicated to a device implementing frequency correction process 10. Similarly, the intended frequency of the reference carrier signal may be determined 102, for example, based upon knowledge of the predetermined intended frequency to be used for the reference carrier signal. Similarly, the frequency of the target signal at the second collector may be determined 104, for example, based upon digitized signal 66, which may be communicated to a device implementing frequency correction process 10. Similarly, the received reference carrier signal may be digitized and may be communicated to a device implementing frequency correction process 10, either alone or as part of digitized signal 66. Various additional/alternative implementations will be appreciated.

Consistent with the foregoing description, it will be appreciated that frequency correction may be applied to a plurality of signal collectors. In some situations, frequency correction may be applied to a plurality of signal collectors that may be, for example, transmitting downlink signals to a central collector or processor. In an embodiment, the above-described process may be implemented in connection with two flying collectors, which may transmit downlinks including their respective captured signals on carriers whose phase as a function of time may be designated as p1A(t) and p1B(t). In a particular embodiment, the best observation point for a given target signal may be from the two airborne collectors. Further, in some situations, the target signal of interest may not be visible from the central platform at all, e.g., when it is on the ground. In an embodiment, the desired time difference of arrival/frequency difference of arrival solution may be between the two airborne collectors. Accordingly, the series unwrap(p1A(t)-p2B(t)) may be scaled by the ratio of the target signal frequency to the downlink carrier frequency to create a corrective series which, when added to the phase of the signal as seen by collector one-B, allows precise frequency difference of arrival estimation compared with the signal from collector one-A. Prior to correction, both p1A(t) and p1B(t) may be adjusted to remove expected Doppler shifts, based on the known geometry and velocities of the platforms. For more than two collectors reporting in, the same process may be applied pairwise.

According to an embodiment, frequency correction process 10 may allow for correction of the frequency reference of a collector operating independently, in particular on an aircraft. In one such embodiment, frequency correction process may utilize non-cooperative transmitters of opportunity. Some transmitters, such as CDMA cellular phone towers, may broadcast signals that have very high frequency accuracy. The frequency in question may be that of the radio carrier, or of any repetitive information imposed on the carrier.

In one such embodiment, an emitter may be used having a location that is known exactly. The known location could, for example, be derived from a database of known emitters, or by information encoded in the transmission, e.g., for a cellular phone tower that broadcasts its own coordinates for benefit of the phone users. Once such an emitter is located and tuned, frequency correction process 10 may use it as a frequency reference as if it were a cooperative transmitter. Frequency correction process 10 may compute the predicted Doppler shift at each instant based on an estimated position and velocity with respect to the emitter position for each signal collector. The apparent reference frequency may be adjusted by the amount of the predicted Doppler shift. What remains may serve as a reference to which to phase lock the other oscillators used in the system. In a generally similar manner as described above, measurements made using a free-running oscillator may be post-corrected with the computed offsets, e.g., rather than actually attempting to slave the on-board oscillator to that of the reference in real-time.

In some embodiments, the locations of the emitters of opportunity may not be known in advance, but may be deduced using frequency-dot geolocation techniques. For example, the platform carrying the signal collector along a trajectory near the emitter can be maneuvered, and the location (on the earth's surface, typically) would give the apparent changes in Doppler shift that best match the ones seen can be computed. If the transmitter is stable, and if the trajectory subtends a significant angle (typically 90 degrees or more) from the emitter location, then the positional estimate may be in a deep, single well of the error surface, and may be accurate to, say, a few hundred meters. Using this as a reference emitter may result in frequency errors due to the positional mis-estimation. Such errors, however, may be minimized by flying a course that is either directly toward or away from the inferred position. The resultant error may be proportional to the cosine of the geometric angle between the emitter and the platform heading, which may only have second order deviation from unity for near-zero angles.

The following numerical example consistent with the foregoing embodiment may illustrate the benefit of using a reference transmitter toward which a signal collector is flying. Consider an aircraft flying 30 meters per second and listening to a stable transmitter emitting a tone at 900 MHz. Approximating the speed of light as 300,000,000 meters per second, the apparent Doppler shift may be 90 Hz times the cosine of the angle between the ground track of the signal collector and the emitter location. An attempt may be made to fly perpendicular to the emitter, for example, to circle it. In such a case, a one degree error in direction may result in an erroneous 90 times sin(1 degree), or 1.571 Hz. If instead, the signal collector files directly toward the emitter, a one degree heading error may cause a frequency misestimate of 90 minus 90 times cos(1 degree), or only 0.014 Hz. The heading-induced error would be only 0.015 parts per billion, down from 1.74 parts per billion. At this level of accuracy, errors caused by changes in elevation angle may become significant. These errors can be mitigated, for example, by compensating via range estimates, or flying close to the ground.

Another embodiment considers the possibility of using a transmitter of opportunity that cannot be located due to trajectory restriction, based on either time constraints, or denied areas of flight. Adjusting a direction of flight to maximize the apparent frequency of an emitter may place the signal collector platform on course toward the emitter. At long range, and/or low flight altitude, the vertical component of direction will contribute little to the Doppler shift. Once a course has been established directly toward an emitter, the emitter may be used as a reference, ignoring its range, and using the full measure of the signal collector's ground speed to compute the required Doppler correction. This can be done in conjunction with minor dithering left and right of the optimal course to ensure that we are following an optimal heading.

Considering another illustrative implementation, suppose a radio relay, accessible by the signal collection platform, is provided that receives a signal at approximately G1 Hz, and retransmits at G2 Hz, where G2=G1+S, S being the frequency shift of the relay. It may be assumed that the relay is high quality, so that S is near exact. Using a phase locked transmitter and receiver at the collection platform, we can correct our errors as follows:

1. Assume that a timebase, to which all of the oscillators in the system are locked, is off by a factor of (1+ϵ). For example, ϵ could be 20 parts per billion, or (0.000000020).
2. Transmit a signal at the frequency we believe to be F1.
3. Receive the signal retransmitted by the relay. Measure the apparent frequency of the received signal, which may be called Y.
4. Estimate the round trip Doppler shift, α, which is expected given the relative motion of the collection platform and the radio relay, at the F1 and (F+S) frequencies, up and down respectively.
5. Compute a best estimate for ϵ, given by (F1+α+S−Y)/S.

This method may be analyzed as follows: for an attempt to transmit F1, the actual transmission may be F1(1+ϵ). What is received may be F1(1+ϵ)+S+α. Given the timebase error, F1+S/(1+ϵ)+a/(1+ϵ) may be observed. Expanding a short power series, and neglecting all quadratic and higher error terms, the apparent frequency may be written as Y=F1+S−ϵS+α−ϵα. Substituting this in the equation of #5 above, may yield $$\epsilon\_est = \epsilon + \epsilon\alpha/S$$

where the second term is vanishingly small for practical applications, because α≪S, whence ϵ_est=ϵ as desired.

In an embodiment, the foregoing method may be considered to "export the quality" of the relay to the collection system. Random errors in estimating Y may be applied to frequency difference of arrival measurements made using the collection system, scaled by (F3/S), where F3 is the carrier frequency of the environmental signal being located. It may be advantageous, therefore, to use large S.

Depending on the details of the radio hardware, this technique may be conducted either in full duplex mode, or in half duplex mode, using the free space between the collection platform and the radio relay as a delay line. For example, a relay satellite in geosynchronous orbit allows a terrestrial collector to alternate transmitting and receiving for 0.25 second intervals, without collisions. Half-duplex operation may be utilized to correct coarse errors in otherwise stable oscillators, while full-duplex operation may be required to correct rapidly slewing oscillators.

Calculating the value a may depend on the position and velocity of both the collection platform and the radio relay. The former may be provided by a navigation system on the collection platform, e.g. GPS. The latter may be obtained by any means, including a priori knowledge of a fixed relay site, or propagation of ephemeris data for a satellite relay.

Figure 6:
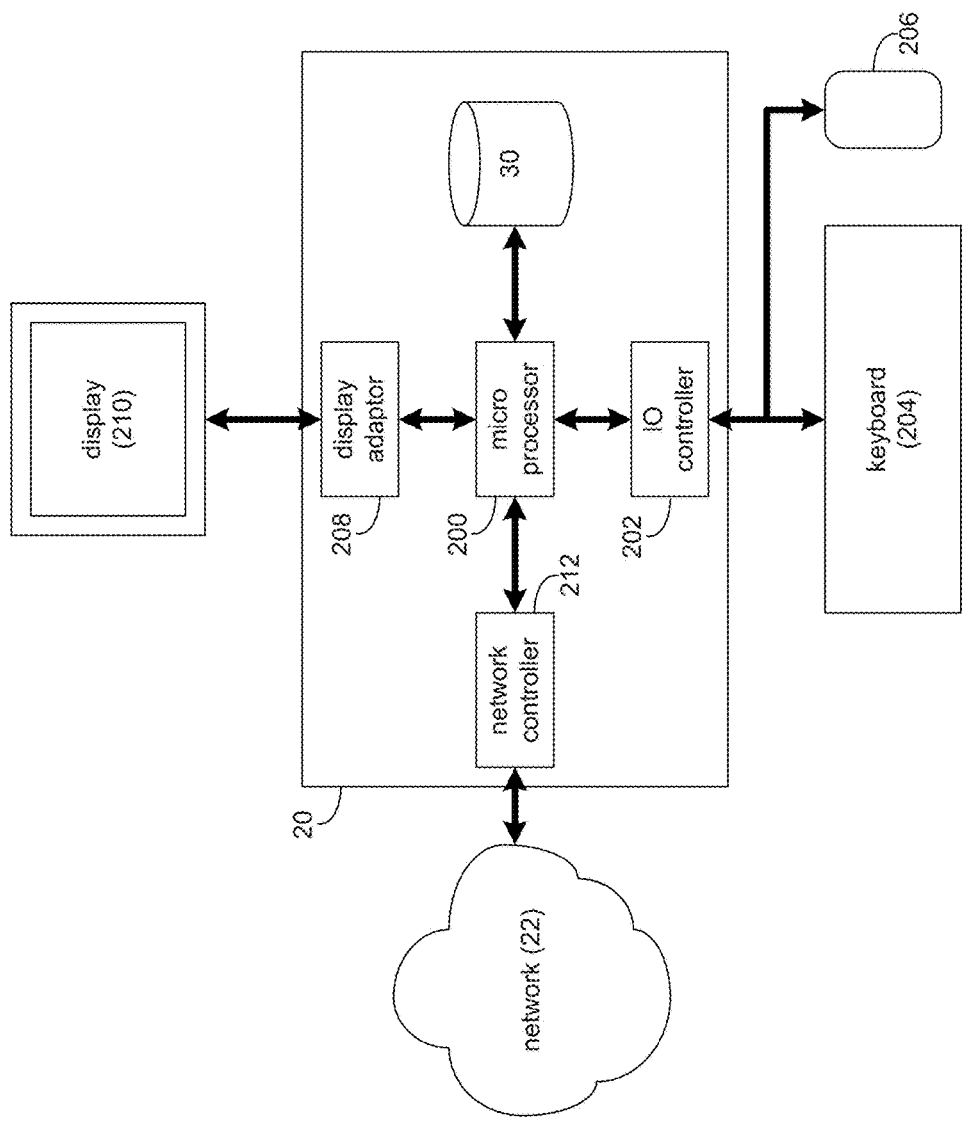
FIG. 6 is a diagrammatic view of a computing device of FIG. 1, according to an implementation of the present disclosure.

Referring also to FIG. 6, there is shown a diagrammatic view of computing system 20. While computing system 20 is shown in this figure, this is for illustrative purposes only and is not intended to be a limitation of this disclosure, as other configuration are possible. For example, any computing device capable of executing, in whole or in part, frequency correction process 10 may be substituted for computing device 20 within FIG. 6, examples of which may include but are not limited to first collector 12, second collector 14, notebook computer 24, and/or another device.

Computing system 20 may include microprocessor 200 configured to e.g., process data and execute instructions/code for frequency correction process 10. Microprocessor 200 may be coupled to storage device 30. As discussed above, examples of storage device 30 may include but are not limited to: a hard disk drive; a tape drive; an optical drive; a RAID device; an NAS device, a Storage Area Network, a random access memory (RAM); a read-only memory (ROM); and all forms of flash memory storage devices. IO controller 202 may be configured to couple microprocessor 200 with various devices, such as keyboard 204, mouse 206, USB ports (not shown), and printer ports (not shown). Display adaptor 208 may be configured to couple display 210 (e.g., a CRT or LCD monitor) with microprocessor 200, while network adapter 212 (e.g., an Ethernet adapter) may be configured to couple microprocessor 200 to network 14 (e.g., the Internet or a local area network).

As will be appreciated by one skilled in the art, the present disclosure may be embodied as a method (e.g., executing in whole or in part on computing device 20), a system (e.g., computing device 20), or a computer program product (e.g., encoded within storage device 30). Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium (e.g., storage device 30) having computer-usable program code embodied in the medium.

Any suitable computer usable or computer readable medium (e.g., storage device 30) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, C#.NET, PHP, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 22).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor (e.g., processor 200) of a general purpose computer/special purpose computer/other programmable data processing apparatus (e.g., computing device 20), such that the instructions, which execute via the processor (e.g., processor 200) of the computer or other programmable data processing apparatus, create means for implementing the functions/acts specified in the flowchart and/or block diagram block or blocks.

These computer program instructions may also be stored in a computer-readable memory (e.g., storage device 30) that may direct a computer (e.g., computing device 20) or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer (e.g., computing device 20) or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
receiving a target signal at a first collector;
receiving the target signal at a second collector;
determining a frequency of the target signal at the first collector based upon, at least in part, a first reference timebase source associated with the first collector;
determining an intended frequency of a reference carrier signal at the first collector based upon, at least in part, the first reference timebase source associated with the first collector;
determining a frequency of the target signal at the second collector based upon, at least in part, a second reference timebase source associated with the second collector;
determining an observed frequency of the reference carrier signal at the second collector based upon, at least in part, the second reference timebase source associated with the second collector;
calculating a relative timebase error between the first collector and the second collector based upon, at least in part, a difference between the intended frequency of the reference carrier signal and the observed frequency of the reference carrier signal;
calculating a corrected frequency difference for the target signal based upon, at least in part, the relative timebase error and a proportional scaling factor; and
geolocating a source of the target signal based upon, at least in part, calculated time difference of arrival and frequency difference of arrival of the target signal at the first collector and at the second collector and based upon, at least in part, the calculated corrected frequency difference for the target signal.

2. The computer-implemented method of claim 1, wherein determining the intended frequency of the reference carrier signal includes transmitting the reference carrier signal having the intended frequency based upon, at least in part, the first reference timebase source.

3. The computer-implemented method of claim 1, wherein determining the frequency of the target signal at the first collector includes receiving data based upon, at least in part, a digitized representation of the target signal from the first collector.

4. The computer-implemented method of claim 3, wherein receiving the data based upon, at least in part, the digitized representation of target signal includes receiving the digitized representation modulated onto the reference carrier signal.

5. The computer-implemented method of claim 1, wherein determining the intended frequency of the reference carrier signal is based upon, at least in part, determining a predetermined intended frequency of the reference carrier signal.

6. The computer-implemented method of claim 1, wherein determining the intended frequency of the reference carrier signal includes:
receiving the reference carrier signal; and
determining the frequency of the received reference carrier signal based upon, at least in part, the first reference timebase source.

7. The computer-implemented method of claim 6, wherein receiving the reference carrier signal includes receiving the reference carrier signal at the first collector.

8. The computer-implemented method of claim 1, wherein the first collector is moving relative to a source of the target signal, the method further including:
determining a first state vector associated with the first collector, the first state vector including position and velocity information associated with the first collector;
determining a relative movement between the first collector and the second collector based upon, at least in part, the first state vector; and
wherein calculating the relative timebase error includes compensating for a frequency shift based upon, at least in part, the relative movement between the first collector and the second collector.

9. The computer-implemented method of claim 8, wherein the second collector is moving relative to the source of the target signal, the method further including:
determining a second state vector associated with the second collector, the second state vector including position and velocity information associated with the second collector;
wherein determining the relative movement between the first collector and the second collector is based upon, at least in part the first state vector and the second state vector; and
wherein calculating the relative timebase error includes compensating for the frequency shift based upon, at least in part, the relative movement between the first collector and the second collector.

10. A computer program product comprising a computer readable medium having a plurality of instructions stored thereon, which, when executed by a processor, cause the processor to perform operations including:
receiving a target signal at a first collector;
receiving the target signal at a second collector;
determining a frequency of the target signal at the first collector based upon, at least in part, a first reference timebase source associated with the first collector;
determining an intended frequency of a reference carrier signal at the first collector based upon, at least in part, the first reference timebase source associated with the first collector;
determining a frequency of the target signal at the second collector based upon, at least in part, a second reference timebase source associated with the second collector;
determining an observed frequency of the reference carrier signal at the second collector based upon, at least in part, the second reference timebase source associated with the second collector;
calculating a relative timebase error between the first collector and the second collector based upon, at least in part, a difference between the intended frequency of the reference carrier signal and the observed frequency of the reference carrier signal;
calculating a corrected frequency difference for the target signal based upon, at least in part, the relative timebase error and a proportional scaling factor; and
geolocating a source of the target signal based upon, at least in part, calculated time difference of arrival and frequency difference of arrival of the target signal at the first collector and at the second collector and based upon, at least in part, the calculated corrected frequency difference for the target signal.

11. The computer program product of claim 10, wherein the instructions for determining the intended frequency of the reference carrier signal include instructions for transmitting the reference carrier signal having the intended frequency based upon, at least in part, the first reference timebase source.

12. The computer program product of claim 10, wherein the instructions for determining the frequency of the target signal at the first collector include instructions for receiving data based upon, at least in part, a digitized representation of the target signal from the first collector.

13. The computer program product of claim 12, wherein the instructions for receiving the data based upon, at least in part, the digitized representation of target signal include instructions for receiving the digitized representation modulated onto the reference carrier signal.

14. The computer program product of claim 10, wherein determining the intended frequency of the reference carrier signal is based upon, at least in part, determining a predetermined intended frequency of the reference carrier signal.

15. The computer program product of claim 10, wherein the instructions for determining the intended frequency of the reference carrier signal include instructions for:
receiving the reference carrier signal; and
determining the frequency of the received reference carrier signal based upon, at least in part, the first reference timebase source.

16. The computer program product of claim 15, wherein the instructions for receiving the reference carrier signal include instructions for receiving the reference carrier signal at the first collector.

17. The computer program product of claim 10, wherein the first collector is moving relative to a source of the target signal, and further including instructions for:
determining a first state vector associated with the first collector, the first state vector including position and velocity information associated with the first collector;
determining a relative movement between the first collector and the second collector based upon, at least in part, the first state vector; and
wherein calculating the relative timebase error includes compensating for a frequency shift based upon, at least in part, the relative movement between the first collector and the second collector.

18. The computer program product of claim 17, wherein the second collector is moving relative to the source of the target signal, and further including instructions for:

determining a second state vector associated with the second collector, the second state vector including position and velocity information associated with the second collector;

wherein determining the relative movement between the first collector and the second collector is based upon, at least in part the first state vector and the second state vector; and wherein calculating the relative timebase error includes compensating for the frequency shift based upon, at least in part, the relative movement between the first collector and the second collector.

19. A computing system comprising:
a processor and a memory module coupled with the processor, the processor being configured for:
determining a frequency of a target signal received at a first collector based upon, at least in part, a first reference timebase source associated with the first collector;
determining an intended frequency of a reference carrier signal at the first collector based upon, at least in part, the first reference timebase source associated with the first collector;
determining a frequency of the target signal received at a second collector based upon, at least in part, a second reference timebase source associated with the second collector;
determining an observed frequency of the reference carrier signal at the second collector based upon, at least in part, the second reference timebase source associated with the second collector;
calculating a relative timebase error between the first collector and the second collector based upon, at least in part, a difference between the intended frequency of the reference carrier signal and the observed frequency of the reference carrier signal;
calculating a corrected frequency difference for the target signal based upon, at least in part, the relative timebase error and a proportional scaling factor; and
geolocating a source of the target signal based upon, at least in part, calculated time difference of arrival and frequency difference of arrival of the target signal at the first collector and at the second collector and based upon, at least in part, the calculated corrected frequency difference for the target signal.

20. The computing system of claim 19, wherein determining the intended frequency of the reference carrier signal includes transmitting the reference carrier signal having the intended frequency based upon, at least in part, the first reference timebase source.

21. The computing system of claim 19, wherein determining the frequency of the target signal at the first collector includes receiving data based upon, at least in part, a digitized representation of the target signal from the first collector.

22. The computing system of claim 21, wherein receiving the data based upon, at least in part, the digitized representation of target signal includes receiving the digitized representation modulated onto the reference carrier signal.

23. The computing system of claim 19, wherein determining the intended frequency of the reference carrier signal is based upon, at least in part, determining a predetermined intended frequency of the reference carrier signal.

24. The computing system of claim 19, wherein determining the intended frequency of the reference carrier signal includes:
receiving the reference carrier signal; and
determining the frequency of the received reference carrier signal based upon, at least in part, the first reference timebase source.

25. The computing system of claim 24, wherein receiving the reference carrier signal includes receiving the reference carrier signal at the first collector.

26. The computing system of claim 19, wherein the first collector is moving relative to a source of the target signal, the processor and memory module further configured for:
determining a first state vector associated with the first collector, the first state vector including position and velocity information associated with the first collector;
determining a relative movement between the first collector and the second collector based upon, at least in part, the first state vector; and
wherein calculating the relative timebase error includes compensating for a frequency shift based upon, at least in part, the relative movement between the first collector and the second collector.

27. The computing system of claim 26, wherein the second collector is moving relative to the source of the target signal, the processor and memory module further configured for:
determining a second state vector associated with the second collector, the second state vector including position and velocity information associated with the second collector;
wherein determining the relative movement between the first collector and the second collector is based upon, at least in part the first state vector and the second state vector; and
wherein calculating the relative timebase error includes compensating for the frequency shift based upon, at least in part, the relative movement between the first collector and the second collector.

* * * * *